Sept. 30, 1958  R. F. MITCHELL  2,853,915
OPTICAL ANGLE MEASURING DEVICE
Filed June 3, 1955  2 Sheets-Sheet 1
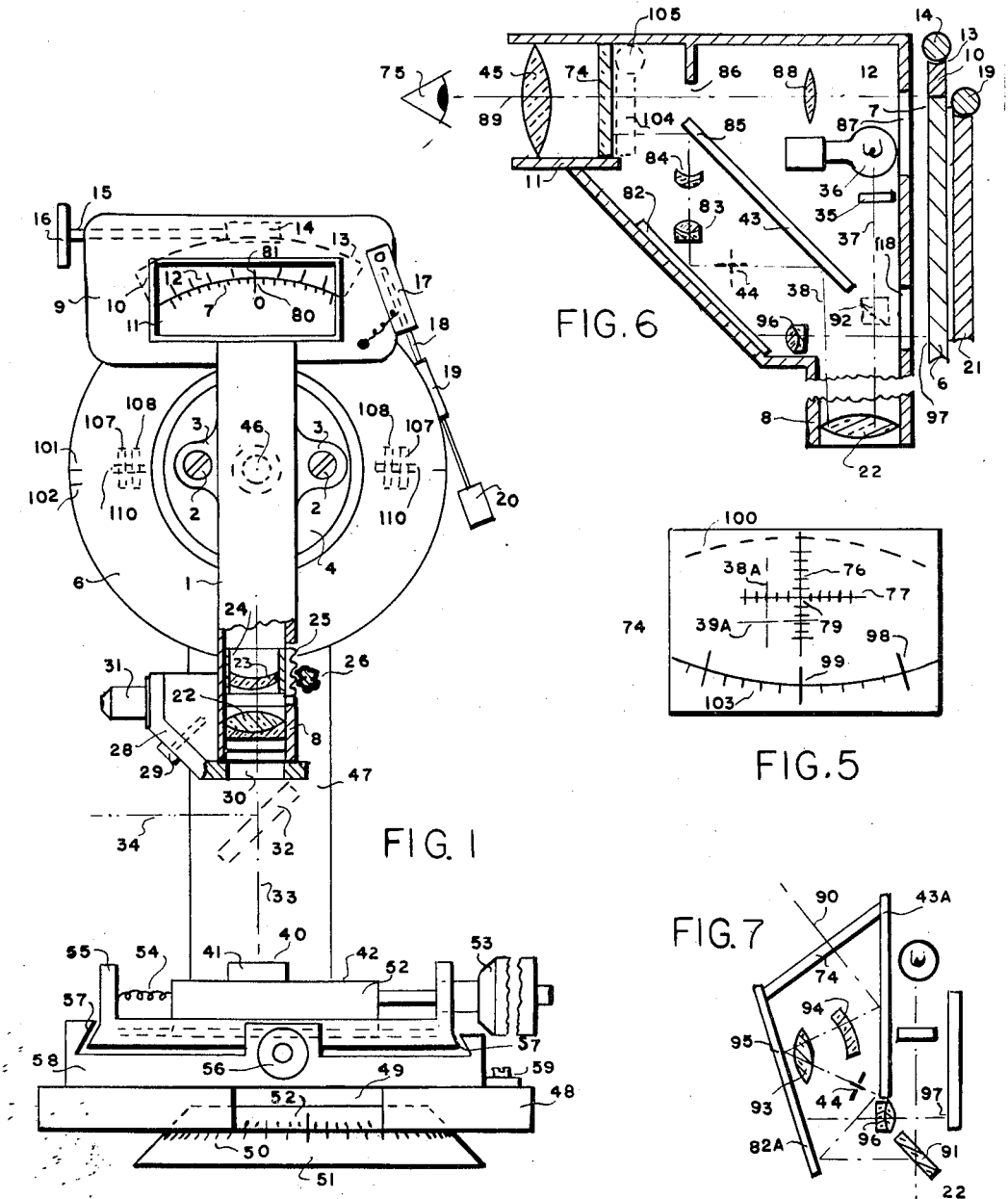

Sept. 30, 1958  R. F. MITCHELL  2,853,915
OPTICAL ANGLE MEASURING DEVICE
Filed June 3, 1955  2 Sheets-Sheet 2
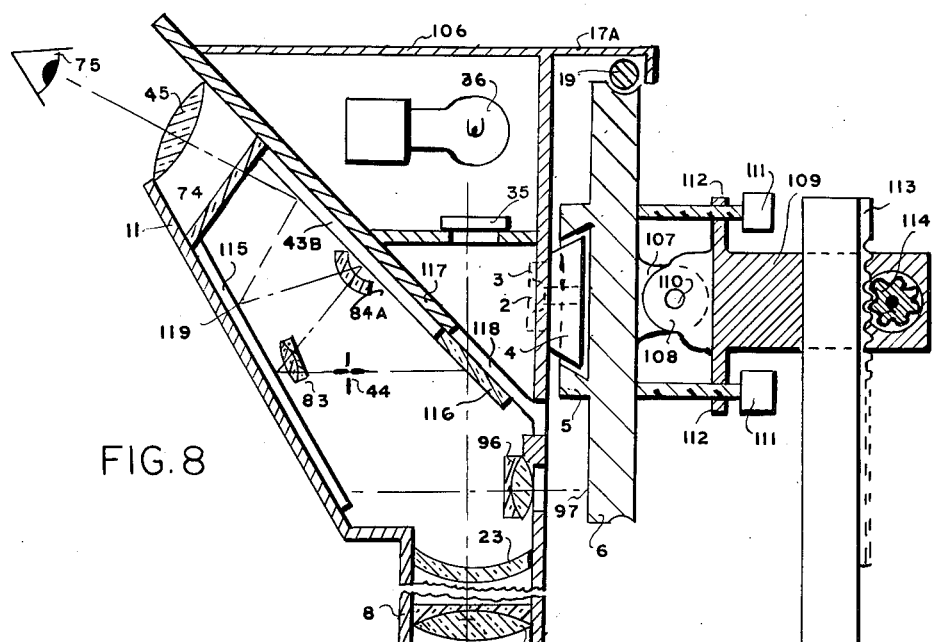
FIG. 8
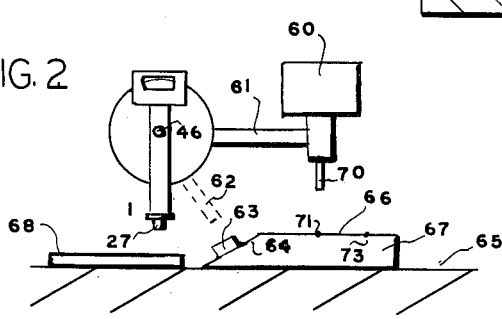
FIG. 3
FIG. 2
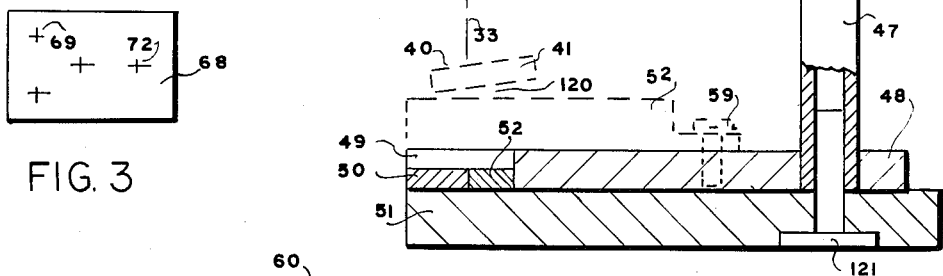
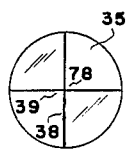
FIG. 4
WITNESSES.
INVENTOR.
Reginald Fawn Mitchell

United States Patent Office 2,853,915  
Patented Sept. 30, 1958

2,853,915

OPTICAL ANGLE MEASURING DEVICE

Reginald F. Mitchell, Mount Vernon, N. Y.

Application June 3, 1955, Serial No. 512,983

18 Claims. (Cl. 88—2.3)

The prime purpose of this invention is to provide an instrument of maximum sensitivity and accuracy and at the same time maximum interchangeability and versatility. It is an important purpose of this invention to do this in such a way that the component parts will be as simple as possible and that they can be assembled and adjusted to the extreme accuracy contemplated with ease and certainty and thus low manufacturing cost. Starting with a collimator having in it an illuminated target and adding focusing means to make it a focusing telescope, and by adding external lenses to make it a layout device or a toolmaker's microscope, I mount this combination optical "head" to revolve accurately concentric with respect to a precisely circularly calibrated dial and add means of adjusting the device to a zero position in two azimuths. Thus this combination can be used for many and sometimes all the uses where separate instruments normally would be used: an angle setting and checking collimator, a focusing and alignment telescope, a theodolite, a machine setting and checking device, a layout device, a toolmaker's microscope. Securing all these features in one device may at first sight seem to make it too complicated to use. Careful consideration of this design, which has been proven in practice, will show that my unique approach has accomplished the incorporation of all these features in a surprisingly simple and effective instrument which is easy to use by the average toolroom mechanic or inspector.

Fig. 1 shows one arrangement of the combination which can use either an eyepiece or a projection type collimator, and which has several built-in or added accessories to give the versatility indicated above.

Fig. 2 shows how the "head" of the device can be mounted on a machine tool to set and check work on that tool and also to be used as a layout device at the same time.

Fig. 3 shows how a simple layout plate can take the place of expensive jigs, fixtures and gage blocks for layout purposes.

Fig. 4 shows one simple arrangement of target reticle.

Fig. 5 shows one arrangement of a calibrated screen or eyepiece reticle for use with a projection type collimator as described.

Fig. 6 shows one arrangement of a projection collimator "head" having several unusual features.

Fig. 7 shows another arrangement of my folded optical system for a projection type collimator "head" for use in my device.

Fig. 8 shows a cut-away side view of the complete instrument and illustrates an advanced arrangement of my especially compact high magnification optical system as used with a projection type "head."

Before describing the above drawings in detail I would like to clarify the terminology used. Because my basic optical system as used in what I call my "head," has so many different functions, a name effectively descriptive of them all is not known to me. For convenience I shall call the optical system a collimator because of the fact that an illuminated target reticle is incorporated in all types shown, and because the focusing feature and extra lenses are actually subordinate to the basic collimator though vital for securing the results I achieve.

In Fig. 1 a collimator 1 is mounted by screws 2 passing through suitable lugs 3 on the collimator to a combination mounting plate and bearing means 4. The bearing can be of any convenient type such as a shaft, ball bearing or a theodolite type beveled ring 5 (see Fig. 8) which can be mounted on but preferably is part of the main dial 6 which is calibrated around its outside edge accurate calibrations 7, which can be in degrees, fractions or decimals of degrees or any convenient circular calibration of the fineness and accuracy necessary for my purpose. The lower part 8 of the collimator 1 holds the objective lens system and the upper part 9 carries the vernier 10 (if used), vernier zero adjusting means, main dial fine adjusting means, and a portion 11 which can be a plain opening for an eyepiece collimator or a lens or screen of a projection type collimator, which can allow a direct or magnified direct view of the dial calibrations at 7 and of the vernier at 12.

If a vernier 10 is used it is very desirable that it can be set to a zero position with respect to the dial 6 when the collimator is set normal to any surface which may be used as a reference surface. One convenient way to do this is to have the top surface 13 of the vernier 10 milled or hobbed with a worm which can be engaged by a worm gear 14, which through a shaft 15 and external knob 16 can be rotated a limited arc around the surface of the dial 6 and which will stay there until reset for a different reference surface. Also on the portion 9 of the collimator is a means for final fine adjustment setting of the collimator assembly as it is revolved with respect to the dial 6. One convenient way of doing this is to have a pivoted bracket 17 on the portion 9. In this a shaft 18 can revolve; this shaft 18 carries a worm gear 19 which can be turned by an adjusting knob 20. The worm gear 19 engages in a corresponding worm cut in the outer edge of a large diameter worm 21 attached to or a part of the dial 6. Other means of accomplishing these same purposes will be obvious to those skilled in the art and I do not wish to be limited to the specific means shown but I do cover the incorporation of these adjustments as important operational features of my device.

Because the demand of modern industry is for greater and greater accuracy, I contemplate using means to measure and set to at least 10 secs. of arc and my arrangement permits measuring to one sec. of arc or even less with accuracy and precision, and more important economy of size and construction, and still allow facility in use by the average good toolroom mechanic or inspector.

One very helpful means of accomplishing this is the use of an inverted telephoto lens system for the collimator objective. A positive element 22 is set in fixed position at the end of the part 8 of the collimator. For the close accuracy cited, this should be a corrected achromat as shown or any adequately corrected positive lens. The negative component of the telephoto system is a negative lens 23 which can be a simple negative lens as shown if properly calculated as a telephoto combination with 22, or it could be any other type of telephoto as long as it performs as required. The negative lens 23 is mounted in a cell 24 having on it a rack 25 which can be operated by a gear 26 so the lens 23 can move up and down the lower part 8 of the collimator. It is obvious to skilled optical designers that when the negative lens 23 is set at the proper position near the lens 22, the collimator will be focused at infinity as necessary for it to be a collimator. When the negative lens 23 is moved away from the positive lens 22 it acts as an internal focusing means and converts the collimator into a conventional internal focusing telescope, the focusing range of which is determined by the relative power of the positive and negative components and the distance they can be separated. Because of the need to maintain high accuracy it is not desirable to stretch this internal focusing range too much, so for close up work—such as for layout and toolmaker microscope work—I prefer to use external supplementary lenses which can be attached to the outside of the portion 8 of the collimator 1. Such an extra lens can be set in a mount 27 (Fig. 2) and screwed on or otherwise attached to the collimator as needed, or a slide or turret or like means can be used to permanently mount one or more such extra lenses to the collimator so they can be swung into position as needed and then swung away without disturbing the main setting. While such auxiliary lenses can under some conditions be used for collimating purposes, their main use is for securing extra magnification or for focusing on objects very close to the device.

While any convenient means can be used, for illustration I show the type of turret familiarly associated with conventional microscopes. Such a turret 28 can revolve on a conventional pivot 29 and have a clear opening 30 which would allow for normal collimator and focusing telescope use. One or more supplementary lenses 31 could be mounted to be swung into position. An important innovation (as far as I know) in my system is the use of a 45° reflector 32. For clarity, I show this dotted at 32 as it would be set in the optical path to direct the beam from the collimator to the left. It could be made reversible to point also to the right or two such mirrors could be used. Also, a penta prism could be employed or similar means. For maximum convenience I find that a semi-reflecting external 45° mirror at 32 allows sighting along the regular sighting axis 33 and at right angle axis 34 at the same time. Apart from the convenience of this right angle or "optical square" sighting, such accessory means properly built into the instrument has another important economic advantage. By being able to sight along a right angle to the left, it is possible to "scan" an arc of 270° with a dial of only 180° arc. By being able to sight both to right and left, it is possible to scan the entire 360° circle with only a 180° calibrated dial. Because of the many graduations needed and the extreme accuracy of each graduated line on the dial, saving half the graduating work is a saving of major cost. Another advantage is that of overall size of the instrument is appreciably diminished. Thus, while for clarity, I have only indicated one possible mirror arrangement at 32, I wish to stress the importance I place on this feature and the possibilities it has if incorporated in the instrument design as explained. It is of interest to point out here that my simple zero setting adjustments described above have useful importance when a mirror, penta prism, optical square or the like is employed at 32. If the setting should be a little off a true right angle, the sight is taken and the zero adjustment set until the dial and vernier read correctly for the line of sight involved. The basic setting principle is a most important practical feature for regular shop use and this is one of the reasons why my combination is so very practical while so simple in arrangement.

In order for the instrument to function as a collimator, a target reticle 35 is set at the precise focus of the objective lens combination when the negative component is set at its nearest position to the positive element. This is the infinity focus setting and with the target reticle 35 illuminated by a lamp 36, the image of the target, which can be cross lines such as 38 and 39 in Fig. 4, is projected as parallel rays, parallel to the axis 33 (or 34 if the mirror 32 is used.) When these parallel rays strike the reflecting surface 40 of a parallel mirror 41 which is most conveniently a gage block placed on the work surface 42, they will be reflected back along their original path when the reflector is precisely normal to the rays. In other words, when the image of the target reticle 35 is returned to the collimator, the objective lens system directs it to a mirror such as at 43 and to a focus at 44 where it can be observed by a projection type eyepiece 45 as will be covered later, or a regular instrument type eyepiece as at 46. If the lens system 22 and 23 is focused on an object instead of collimated, the lamp 36 illuminates the work 41 but the image of the target reticle 35 cannot be seen.

Fig. 1 shows the collimator-dial combination, which I call my "head," mounted on a vertical post 47 which in turn is set in a base 48. This makes the device a two azimuth angle reading or setting device of obvious possibilities. Then again, a toolmaker's cross slide accessory can be set on the base 48 so that, with the "microscope" accessory lens 31 in position in front of the main objective lens 22, the device can be used as an ordinary toolmaker's microscope. The cross-slide accessory can be of any type. Conveniently, a table 52 can be pushed by the micrometer 53 against a spring 54 and ride in any form of slide bearings in a sub-slide 55 which in turn is operated by a cross slide micrometer 56 so the part 55 and the table 52 slide in V or other suitable slides 57 in the main accessory base 58. The cross slide accessory can be held on the base 48 by any convenient means such as screws 59.

Fig. 2 shows how the "head" can be removed from the post 47 and mounted on a machine tool 60 by any convenient post 61 attached to the tool in any manner suitable. Suppose for example it is desired to set a surface 64 at a certain angle to the machine tool table 65. The collimator is turned to a position 62 at the correct angle after "zeroing" it on the table 65. A reflector gage block 63 on the surface 64 enables that surface to be set at the proper angle. Then the surface 66 of the work piece 67 can be made so it is parallel to the machine tool table 65 and thus the proper angle to the surface 64. Then the collimator can be returned to its position normal to the table 65 and the supplementary microscope lens 27 set on it. A scribed layout plate (Fig. 3) can be set at 69 on the table 65 and the collimator head focused on it. When a scribed cross line such as at 69 is centered in the eyepiece 46, the tool 70 is operated, such as to drill or bore a hole at a position 71 on the work piece 67. When the table 65 is moved, another cross line such as 72 could be centered under the device which would bring a point 73 under the tool 70. Obviously the distance between the points 71 and 73 on the work piece 67 are precisely the same as the distance between the cross lines 69 and 72 on the master scribed layout piece 68. Because of the very high magnification conveniently obtainable in my device, this match is very close—easily to .0001" or less. It is apparent that this simple adaptation of my "head" allows it to be used for a number of purposes on a machine tool and with maximum ease and accuracy. Many variations of the above basic angle setting and layout uses may be obtained within the essential arrangement of my device. Going still further, if the work piece 67 was small enough, it could be checked on the cross slide table 52 if desired for any reason.

One of the principal advantages of my device apart from its extreme versatility is the ease with which it can be used to such great accuracy. While this can be obtained with an eyepiece type collimator I prefer to use a projection type device where the original reflected image of the target 35 is focused at a position 44 and then picked up by another lens or lens system and focused as a greatly enlarged image on a screen or engraved eyepiece "reticle" of substantial size such as 74, Fig. 5. This is at least 2" x 3" in size so it can be read easily by the eye 75, with or without a supplementary eyepiece magnifier lens 45. On the screen or reticle 74 are cross lines 76 and 77 which are calibrated in seconds of arc or any other convenient measure of angular error or angular difference. For example, if the image of the cross lines 38 and 39 was focused at a position 38a and 39a on the reticle 74, it would indicate that the mirror surface 40 was 3 divisions off in both azimuths, thus enabling minor errors or differences to be read in the eyepiece without setting the dial 6. When the image of the lines 38 and 39 was exactly superimposed on the calibrated lines 76 and 77, the center 78 of the target would be at 79, centered in the eyepiece calibrations. Then the surface 40 and therefore the work surface 42 (Fig. 1) would be precisely normal to the optical axis 33. Then the knob 16 would move the vernier 10 until the dial zero 80 and the vernier zero 81 were in line, thus establishing the "zero" setting of the instrument aforementioned. Refer to description of Fig. 8 for setting the zero in the horizontal azimuth.

Fig. 6 shows a very simple arrangement of a projection type collimator arranged with my calibrated dial and zero setting means for the purposes described. In this particular arrangement, the light from the target reticle 35 just misses the mirror 43 and enters the lens 22. After reflection as described, the image passes back through the lens 22 and strikes the mirror 43 as shown and focuses at 44 whether the lens 22 is set for collimation or focused on an object. Or, a portion of the reflected beam from 41 will be reflected by the beam splitter 91 to the mirror 82 and thence to a focus at 44. A second mirror 82, parallel to the mirror 43 reflects the image from 44 into a pickup lens system which for compactness is another telephoto lens system having a positive component 83 and a negative component 84. This pickup lens system focuses the image at 44 on the screen 74 after another reflection at 85 as shown. By arranging the mirrors 43 and 82 as shown, the screen 74 is parallel to the plane of the dial 6. By having suitable openings 86 and 87, a lens 88 can image the dial 6 and vernier 10 on the screen 74. Note also how the arrangement of the lamp 36 lends itself to effective illumination through the opening 87. Fig. 6 is a relatively simple arrangement and has many advantages if a vernier 10 is used. However, for the degree of angular accuracy less than 10 secs. of arc, this begins to be difficult to use or at least sizable and cumbersome. Then again there may be objection to having the line of sight 89 in a horizontal plane. In order to bring this line of sight up to a more convenient viewing angle as at 90 in Fig. 7, one or both the mirrors 43 and 82 must be tilted to less than the 45° angle to the dial 6 shown in Fig. 6. Immediately it is apparent that the mirror 43 cannot be used to reflect the image of the cross lines to 44, so another mirror 91 must be used. This can be of any type but I prefer that it be a beam splitting mirror as at 91 or a conventional beam splitter prism as indicated at 92. Note at this point how a beam splitter at 92 can be used to reflect the image to 44 in Fig. 6 instead of using an "offset" beam arrangement as shown. For extreme alignment accuracy, such as to one sec. of arc or less, there is a lot to be said of the advantage of using the beam splitter in this way, so it is shown and described in Figs. 7 and 8. Fig. 7 shows two further innovations. First the mirrors 43a and 82a are not parallel but diverging. This compresses the optical path at the lower end and spreads it out at the upper or screen end, and in addition gives a longer optical path. The second innovation is the placement of the positive lens or lens component at a position 93 where it passes the "pick-up" image twice, once before it hits the mirror 83a and again immediately after. By this very simple placement of the lens 93 its effective magnifying power is doubled. Even more important is the fact that a lens of relatively large aperture can be used without employment of steep curves in the glass to get magnification. By the use of diverging mirrors as shown in Fig. 7 the angle of reflection at 95 can be a minimum so as to cut down on the angular image distortion that may be involved though by entering and leaving the lens 93 at the same angle from normal, this distortion would tend to be compensated for. In any case it can be cut down to a satisfactory amount by design of the lenses 93 and 94 and by the relative power and placement of the negative component 94. It is obvious that by the very simple arrangement shown in Fig. 7, the "pick-up" magnification is much greater than with the arrangement in Fig. 6. This in turn means that the graduations on 76 and 77 can be further apart for the same angular error and thus easier to read. Or, alternately, the instrument can be smaller for the same accuracy and adequately readable spacing of the calibrations on 76 and 77. By using a lens 96 as shown in Figs. 6 and 7, the vernier 10 can be dispensed with by having this lens 96 image at portion 97 of the dial 6 on the screen 74 at 98 where calibrations 98 and 99 could be the image of adjacent dial calibrations 101 and 102 if the collimator were set at 90° on the dial so the lens 96 would be over the graduations 101 and 102. Then the vernier 10 could be supplanted by an "optical" vernier 103 which could be engraved on the screen 74 as in Fig. 5 but which preferably were on a separate eyepiece vernier 104 having a zero setting means 105 as for the means 14 for the regular vernier 10. Referring back to Fig. 1, note how it is possible to read the graduations 50 on the sub-base 51 through the lens 22 (with perhaps the supplementary lens 31 in place). Then the eyepiece reticle 74 could have another graduation 100 for reading this second azimuth angular setting in the projection eyepiece 45. This graduation 100 could be on the screen 74 or the separate "vernier" 104 as preferred. In any case, this simple arrangement enables a maximum of convenience with relatively simple optical means.

Fig. 8 shows a part sectional view of still another folded optical mirror system and shows additional details of the preferred means of mounting the "head" on a post 47 and base 48. The optical system proper is housed in a lightproof case 106 which is mounted by screws 2 which hold a lug or similar projection 3 from the case 106 on to a bearing ring such as 4. As described above, this can rotate in a mating bearing ring 5 which is attached to or preferably a part of the dial 6 as clearly shown in Fig. 8. The dial 6 has two lugs 107 at the back which are fastened to mating lugs 108 in a bracket 109 by shafts or pins 110. Two screws 111 screw through extensions 112 top and bottom of the bracket 109, or 112 can be a ring around 109. By loosening the top screw 111 and tightening the bottom screw 111 the entire collimator-dial "head" can be tilted upward. Reversing the process will tilt the head down. Thus this horizontal tilt procedure can be used to bring the image of the horizontal cross line 39a in Fig. 5 up to the eyepiece reticle calibration 77. Any other method of horizontally tilting the head assembly can be used; the important thing is the ease with which a horizontal zero can be set for any reference surface without the more or less "conventional" process of tapping the instrument back and forth until a zero is obtained. This simple zeroing system, built in my design is a major reason why it is so easy to get effective results in a machine shop despite the extreme accuracy involved. Any desired method may be used for setting the head at a convenient operating height above the work. Fig. 8 shows one simple way where a gear rack 113 is mounted on the post 47. The bracket carries a gear 114 as shown. As this is well known it will not be described further. Fig. 8 also shows a modified housing extension 17a to hold a fine adjustment dial gear 19 to operate as covered. This may be preferred if no vernier is used. In Fig. 8 the first "pick-up" mirror 43b is set at 45° to the plane of the dial 6. This is not necessary as mentioned before but it has some advantages. Apart from the space it allows for the lamp 36 it allows a beam splitting pellicule or mirror 116 to be mounted in the same plane as the mirror 43b on the same portion 117 of the head housing. Note incidentally how an opening 118 in the housing part 117 allows the mirror 116 (or 91 in Fig. 7) to direct light on the dial at 97 so that graduations there will be illuminated for the lens 96 to image them at 44, so that both the dial calibrations and the reflected image of the cross line target can be picked up by the telephoto pick lens system, whichever one is used. In Fig. 8 two further innovations are shown. First, the second pick up mirror 115 is arranged to converge to the first mirror 43b instead of being parallel as in Fig. 6 or diverging as in Fig. 7. Perhaps this more than anything else points up the advantages of my two telephoto lens combinations. They have such compact magnification potential that it is not too important how the mirrors are arranged in a folded optical system. This means that the mirrors can be set primarily to suit such factors as the amount of room needed for the lamp, or for mounting the beam splitter 116 on the housing part 117, or for any purely mechanical or manufacturing reasons. For practical cost control this has exceptional advantages. The second innovation shown in Fig. 8 is the arrangement where both the positive pickup lens 83 and the negative component 84 are set adjacent to the mirrors so the image beam passes through them twice giving a maximum of the doubling effect and thus the maximum magnification in a minimum space. At this point I would like to make it quite clear that I do not wish to be bound by the specific pick up lens arrangements of Figs. 6, 7 or 8. It may be found desirable for some purposes to reverse the positive and negative lenses from any of the positions shown. Then again, instead of having the negative component at 84a as in Fig. 8, it may be desired to have it at 119 where the beam again strikes the mirror 115, or the positive lens may be at 119 and the negative lens at 83. In other words, the essential features of my pick up system is the fact that I use a telephoto combination and use the beam doubling feature if and as found desirable or necessary to get the results desired in the space available.

Fig. 8 shows a few extra minor points of interest. For example the reflector 41 is set at a small angular error 120 to give the image displacement 38a and 39a in Fig. 5. The sub-base 51 has flat circular dial calibrations and vernier at 50 and 52 instead of bevelled ones as indicated in Fig. 1. Then, the sub-base 51 can have a pivot shaft 121 set in the post 47 so it can revolve with the necessary accuracy with respect to the main base 48 and the head assembly mounted on the post 47. In this drawing, as in the others, angular differences and beam paths have been exaggerated for clarity. Thus two or more reflections can be used where I indicate only one and the various parts can be set closer together or further apart or at different angles without modifying the basic features of the invention.

I claim:

1. A combination optical device the optical "head" of which consists of a housing having a lamp illuminating a target reticle set at the focus of a telephoto type objective which has a fixed positive component and a movable negative component so that when said negative component is set to focus said target at infinity the head system functions as a collimator and when said negative component is moved inside said housing and away from said positive element the head will function as an internal focusing telescope to focus on an object being viewed by the device, a beam splitting means set in the case between said illuminated reticle and objective so that the light can pass through the reticle, beam splitter and objective to illuminate said object and so the light reflected by the object or by a reflector set on the object can return through the objective to the beam splitter which will in turn reflect a substantial part of the said reflected beam to a mirror at the side of the housing away from the lamp and from thence to a second mirror placed between the first mirror and the lamp and which is set as close to said beam splitter as feasible, these two said mirrors forming a compact folded optical system to reflect the image of said object transmitted into said head by said objective in such a way that the focus and alignment of said image with respect to a suitably calibrated reticle in said housing may be observed by any convenient eyepiece magnifying system, said housing being mounted on an intermediate bracket or bearing means so it can be separated as needed, said intermediate means arranged so said head can revolve precisely concentric with respect to a circularly calibrated dial having on it suitable mating bearing means, said dial being mounted on to a main holding or mounting bracket so it can be pivoted slightly up or down and locked at a zero setting with respect to any external surface or object imaged in said head, with said main mounting bracket such that the head and dial combination can be mounted on a post set in a conventional instrument type base or on a machine tool or the like as needed, said dial having on it a worm gear or the like by which a mating gear revolvably and pivotably mounted on said housing can set said head to close angular settings with respect to said dial, a vernier and means to set and hold said vernier at a zero reference position with respect to said dial for any surface which may be used as a reference surface with said device as explained.

2. A combination optical device, as in claim 1, having a 45° mirror or equivalent means such as a penta prism arranged so that the device can be sighted along an axis right or left of the normal axis of said objective so that said dial can be less than 360° and yet scan a full circle, sighting 90° to objective axis.

3. A combination optical device, as in claim 1, having on it a 45° beam splitting means so arranged that the device can be sighted along an axis 90° to the right or rotated to sight along an axis 90° to the left of the normal axis of said objective and at the same time sight along the normal objective axis.

4. A combination optical device the optical "head" of which consists of a housing having a lamp illuminating a target reticle set at the focus of a telephoto type objective which has a fixed positive component and a movable negative component so that when said negative component is set to focus said target at infinity the head system functions as a collimator and when said negative component is moved inside said housing and away from said positive component the head will function as an internal focusing telescope, said head having a mirror inside it set at 45° to the optical axis of said objective so that the beam from said target reticle can just miss said mirror and enter said objective to illuminate an object to be viewed by the device in such manner that the object or a reflector placed on the object can reflect light back through the objective to strike said mirror and will be reflected by said mirror so said objective can focus the image of said external object inside said head away from said target reticle, a second mirror inside said head placed with respect to said first mirror as to form a folded optical system to secure maximum optical path length in minimum space, with a second telephoto lens system having a positive and a negative component picking up said focused image and focusing it greatly enlarged and in correct alignment and position with respect to a calibrated screen or eyepiece reticle whose calibrations match the combined magnifying power of both telephoto lens systems, said housing being mounted on an intermediate bracket or bearing means so it can be separated as needed, said intermediate means arranged so said head can revolve precisely concentric with respect to a circularly calibrated dial having on it suitable mating bearing means, said dial being mounted on a main holding or mounting bracket so it can be pivoted slightly up or down and locked at a zero setting with respect to any external surface or object imaged in said head, with said main mounting bracket such that the head and dial combination can be mounted on a post set in a conventional instrument type base or on a machine tool or the like as needed, said dial having on it means such as a worm gear by which a mating gear or means revolvably and pivotably mounted on said housing can set said head to close angular settings with respect to said dial, a lens mounted in said housing and set adjacent to a portion of said calibrated dial so that it can image calibrations at said dial portion at the same position as the image of said external object so it in turn can be picked up by said second telephoto system and focused in correct alignment and position on said screen, with said screen having suitable graduations to read correctly for the combined magnification of said lens and second telephoto system, with a suitable opening in said housing so light from said lamp can illuminate the dial as imaged by said lens adjacent to it and another opening if needed so said lens can vew said dial portion.

5. A combined optical device, as in claim 4, except that another internal screen or calibrated reticle be placed alongside the regular screen and with means to adjust this second screen for a limited extent so that graduations on said second screen can be set to a zero reference position with respect to any external object or surface which may be imaged by said objective.

6. A combination optical device, as in claim 4, having auxiliary lenses in separable mounts or on a turret or similar device set on the device such that said auxiliary lens or lenses can be used to focus the device on objects closer than can be focused by said movement of said internal negative component.

7. A combination optical device, as in claim 4, having a 45° mirror or equivalent means such as a penta prism arranged so that the device can be sighted along an axis right or left and 90° to the normal axis of said objective so that said dial can be less than 360° and yet scan a full circle.

8. A combination optical device, as in claim 4, having on it a 45° beam splitting means so arranged that the device can be sighted along an axis 90° to the right or rotated to sight along an axis 90° to the left of the normal axis of said objective and at the same time sight along the normal objective axis.

9. A combination optical device, as in claim 4, where one or both positive and negative components of said telephoto pickup system are placed closely adjacent to either said mirrors of said folded optical system in order to secure a double passage of the said image through a lens so placed, once before and once after reflection by said mirror, said arrangement thus essentially doubling the magnifying power of a lens so located.

10. A combination optical device the optical "head" of which consists of a housing having a lamp illuminating a target reticle set at the focus of a telephoto type objective which has a fixed positive component and a movable negative component so that when said negative component is set to focus said target reticle at infinity the head system functions as a collimator and when said negative component is moved inside said housing and away from said positive component the head will function as an internal focusing telescope, said head having a beam splitting means set between said illuminated reticle and said objective with the effective beam splitting surface of said beam splitter set at 45° to the optical axis of said objective so that light passing through the beam splitter and objective can illuminate an object to be viewed by the device and so that light reflected by the object or by a reflector placed on said object can return to said head through said objective and with a substantial portion being reflected by said beam splitting surface to a mirror set in the housing away from the beam splitter and from thence to a second mirror placed substantially near the beam splitter, either or both said mirrors being set at an angle other than said 45° at which said beam splitter surface is set so that said mirrors form a compact folded optical system to secure maximum optical path length in minimum space, said objective focusing said reflected light from object at a focus inside said head so that a second telephoto type lens system consisting of a positive component and a negative component can pick up said focused image and refocus it greatly enlarged and in correct alignment and position with respect to a calibrated screen whose calibrations match the combined magnification of both telephoto systems, said housing being mounted on an intermediate bracket or bearing means so said head can be removed as needed, said intermediate means being so arranged that said head can revolve precisely concentric with respect to a circularly calibrated dial having suitable mating bearing means and which is mounted on said intermediate bracket with the dial being substantially parallel to the axis of said objective, said dial being so mounted on said bracket that it can be pivoted slightly near to or away from said objective axis and locked at a zero setting with respect to said object, with the combined dial and head assembly arranged such that they can be mounted on a post set in a conventional type instrument base or on a machine tool or the like as needed, said dial having on it means such as a worm gear by which a mating gear means revolvably and pivotably mounted on said housing can set said head to a close angular setting with respect to said dial, an opening in the housing so that said beam splitter can cause a portion of the dial to be illuminated, a lens adjacent said illuminated portion of dial set so it can focus the illuminated calibrations of the dial portion at said focus position inside said head so that they in turn can be picked up by said second telephoto system and imaged in correct focus and alignment on a second calibrated screen placed closely adjacent to first said screen, which second screen has suitable calibrations to match the magnification of said dial calibrations imaged on it, with means to adjust to a limited extent the second screen relative to the first so that the graduations on the second screen can be set to a zero reference position with respect to the calibrations on the first screen or with respect to any external object being viewed by the device.

11. A combination optical device, as in claim 10, having auxiliary lenses in separable mounts or on a turret or similar device set on the device such that said auxiliary lens or lenses can be used to focus the device on objects closer than can be focused by said movement of said internal negative component.

12. A combination optical device, as in claim 10, having auxiliary lenses in separable mounts or on a turret or similar device set on the device such that said auxiliary lens or lenses can be used to focus the device on objects closer than can be focused by said movement of said internal negative component.

13. A combination optical device, as in claim 10, having a 45° mirror or equivalent means such as a penta prism arranged so that the device can be sighted along an axis 90° right or left to the normal axis of said objective so that said dial can be less than 360° and yet scan a full circle.

14. A combination optical device, as in claim 10, having on it a 45° beam splitting means arranged so the device can be sighted along an axis 90° to the right or rotated to sight along an axis 90° to the left of the normal axis of said objective and at the same time sight along the normal objective axis.

15. A combination optical device, as in claim 10, where one or both positive and negative components of said telephoto pickup system are placed closely adjacent to either said mirrors of said folded optical system in order to secure a double passage of said image through a lens so placed, once before and once after reflection by said mirror, said arrangement thus essentially doubling the magnifying power of a lens so located.

16. A combination optical device the optical "head" of which consists of a housing having a lamp illuminating a target reticle set at the focus of a telephoto type objective which has a fixed positive component and a movable negative component so that when said negative component is set to focus said target at infinity the head system functions as a collimator and when said negative component is moved inside said housing and away from said positive component the head will function as in internal focusing telescope, said head having in it a beam splitting means in the axis of said objective set so it will reflect to a focus inside said head and away from said target the image of any object in the field of view of said objective, a mirror placed adjacent said beam splitter and a second mirror inside said housing placed with respect to said first mirror as to form a folded optical system to secure maximum optical path length in minimum space, with a second telephoto lens system which has a positive component and a negative component picking up said focused image and focusing it greatly enlarged and in correct alignment and position with respect to a calibrated screen or eyepiece reticle whose calibrations match the combination magnification of both said telephoto lenses, said housing being mounted on an intermediate bracket or bearing means so it can be separated as needed, said intermediate means arranged so said head can revolve precisely concentric with respect to a circularly calibrated dial the plane of which is substantially parallel to the plane of said objective axis and which dial has on it suitable mating bearing means, said dial being mounted on a main holding or mounting bracket so it can be pivoted slightly near to away from said objective axis and locked at a zero setting with respect to any external surface or object imaged in said head, with said mounting bracket such that the dial and head combination can be mounted on a post set in an instrument type base, said dial having on it a worm gear or similar means by which a mating gear mounted on said housing can set the housing and dial to a close angular setting, a lens adjacent to a portion of said dial which is illuminated from said lamp through a opening or openings in said housing so that said lens can image said dial portion inside head so this image can be picked up by said second telephoto system and imaged on said screen in correct alignment and position, said base arranged so a toolmaker's micrometer type cross slide accessory can be mounted thereon and with provision on said base so that a circularly calibrated sub-base can be mounted thereon and pivoted to revolve accurately with respect to said main base, with a supplementary lens which can be set externally to said objective to focus on objects closer than can be focused by said negative lens focusing movement, with calibrations on said screen matching the calibrations on said micrometer cross slide or said circularly calibrated sub-base so that correct readings can be made by viewing said screen in addition to reading angular setting of said head with respect to said dial, angular settings of an object viewed by the device in addition to separate readings of the two azimuth and angular settings of said cross-slide and sub-base accessory assembly.

17. A combination optical device as in claim 16, except that a second calibrated screen is placed closely adjacent to said first screen and with the second screen having means to adjust to a limited extent its position so as to permit rapid and easy setting of a zero reference of said calibrations on this screen.

18. A combination optical device the optical "head" of which consists of a housing having a lamp illuminating a target reticle set at the focus of a telephoto type objective which has a fixed positive component and a movable negative component so that when said negative component is set to focus said target at infinity the head system functions as a collimator and when said negative component is moved away from said positive component the head system will function as an internal focusing telescope to focus on an object being viewed by the device, a beam splitting means set in the case between said illuminated reticle and objective so that the light can pass through the reticle, beam splitter and objective to illuminate said object and so the light reflected by the object or by a reflector set on the object can return through the objective to the beam splitter which will in turn reflect a substantial part of the said reflected beam to a mirror at the side of the housing away from the lamp and from thence to a second mirror placed between the first mirror and the lamp and which is set as close to said beam splitter as feasible, these two mirrors forming a compact folded optical system which will enable said objective to focus said returned beam to a focus in said housing and so that a second telephoto type optical system can pick up said focused beam and refocus it on a substantially sized calibrated screen, said second telephoto system consisting of separated positive and negative lens components mounted in said housing between said mirrors as necessary to function as described, said housing being mounted on an intermediate bracket or bearing means so that said head can be revolved precisely concentric with respect to a circularly calibrated dial, said bracket having a vernier which has means so it can be adjusted slightly around said dial to a zero reference position with respect to the calibrations of said dial or with respect to the calibrations of said calibrated screen which is located with respect to said lamp and vernier that the vernier is illuminated by said lamp through suitable openings through said housing and with a lens between said vernier and dial and said calibrated screen so that the dial and vernier readings can be imaged on said screen with correct relation to said screen calibrations and thus to permit simultaneous viewing of the object and the dial and vernier on said screen.

References Cited in the file of this patent

UNITED STATES PATENTS

| | | |
|---|---|---|
| 1,601,864 | Leroux | Oct. 5, 1926 |
| 2,038,914 | Templeton | Apr. 28, 1936 |
| 2,170,967 | Eppenstein et al. | Aug. 29, 1939 |
| 2,185,926 | Senecal | Jan. 2, 1940 |
| 2,237,943 | Lihotzky | Apr. 8, 1941 |
| 2,307,951 | Plaut et al. | Jan. 12, 1943 |
| 2,471,940 | Dion | May 31, 1949 |
| 2,486,645 | Hager | Nov. 1, 1949 |
| 2,557,029 | Griffin | June 12, 1951 |
| 2,577,807 | Pryor | Dec. 11, 1951 |
| 2,610,552 | Victory | Sept. 16, 1952 |

FOREIGN PATENTS

| | | |
|---|---|---|
| 313,822 | Germany | July 21, 1919 |
| 269,718 | Great Britain | Apr. 28, 1927 |